United States Patent [19]

Taylor

[11] 4,257,787
[45] Mar. 24, 1981

[54] AUXILIARY DISPENSING DEVICE FOR AIR TREATMENT

[76] Inventor: Christine S. Taylor, 631 E. Florence Ave., West Covina, Calif. 91790

[21] Appl. No.: 86,593

[22] Filed: Oct. 19, 1979

[51] Int. Cl.³ .............................................. B01D 46/10
[52] U.S. Cl. ...................... 55/279; 422/123; 422/306
[58] Field of Search ................ 55/279, 316, 387; 422/122–123, 306

[56] References Cited

U.S. PATENT DOCUMENTS

| | | | |
|---|---|---|---|
| 3,902,877 | 9/1975 | Swaim | 55/279 X |
| 4,028,073 | 6/1977 | Swaim | 55/279 |
| 4,065,262 | 12/1977 | Petroff | 55/279 |

Primary Examiner—Kathleen J. Prunner
Attorney, Agent, or Firm—Boniard I. Brown

[57] ABSTRACT

A dispensing device for mounting cakes of air treatment material in air distribution systems has bracket means for securement to an air filter panel and open cups for receiving the cakes secured by coupling means to the bracket means. The bracket comprises mutually slidable elements having integral hooks to engage opposite edge portions of a filter panel, these elements having their overlapping portions secured together by friction catch means. The coupling means preferably includes releasable snap-action fasteners, typically mounted on the cups. The cups are provided with openings to permit air passage about the cakes.

7 Claims, 4 Drawing Figures

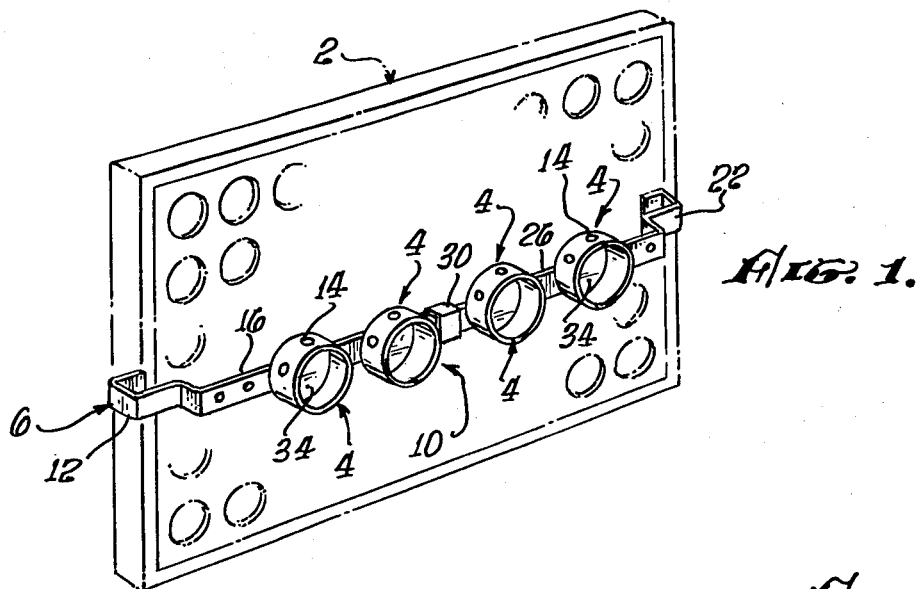

AUXILIARY DISPENSING DEVICE FOR AIR TREATMENT

BACKGROUND OF THE INVENTION

The present invention relates to dispensing devices for mounting cakes of air treatment materials in air distribution systems, and more particularly to such devices wherein cake-receiving cups are mounted on bracket means secured to filter panels positioned in the air distribution system.

The treatment of air by the evaporation or sublimation into the atmosphere of materials, such as odorants, germicides, and absorbents, is well known in the art. Such treatment materials are advantageously prepared in the form of solid cakes, often incorporating a carrier as well as the active treatment agent, from which particles of molecular size can evaporate or sublimate into the surrounding atmosphere.

In the use of such treatment materials, the problem arises of locating and maintaining treatment cakes in the air flow of forced air ventilation systems, such as are commonly associated with central heating and air conditioning installations. Several prior art arrangements have located such materials in conventional air filters either by impregnating the fibrous matrix of the filter with the treating substance, as disclosed in U.S. Pat. No. 4,118,226 to Bourassa, or by configuring special filter pads into which individual holders of treatment cakes may be inserted, as disclosed in U.S. Pat. Nos. 3,902,877 and 4,028,073 to Swaim.

Such prior art arrangements have not met with wide success due to the requirement that specially prepared or manufactured filters be employed and, in some of the proposed structures, because of the predictable fouling of the dispensing surfaces with dust and particulate matter deposited from the airstream, while the filter is performing its primary function of cleansing the air flow.

It is therefore a primary object of the present invention to provide means for securing air treatment materials, typically in cake form, to conventional air filters.

It is an object of the invention to provide means for positioning air treatment materials adjacent filter panels, which means are readily adaptable to a wide range of filter panel sizes.

It is an object of the invention to provide brackets for mounting of air treatment materials proximate to conventional air filter panels, whereby the materials are held in cups securable to such brackets at different inclinations, thus to adapt the dispensing device to different filter panel orientations.

SUMMARY OF THE INVENTION

The foregoing objects, together with other objects and advantages which will become apparent from the description of the preferred embodiments of the invention, are attained by a dispensing device for the mounting of air treatment material cakes on filter panels in air distribution systems, the device including open cups for receiving the cakes secured by coupling means to an adjustable bracket having mutually slidable elements and hooks for engaging the edge portions of filter panels. The slidable adjustment of the bracket readily accommodates filter panels of different sizes.

The cups are provided with openings to permit passage of air over the air treatment cakes for sublimation thereof into the passing air. The cups are preferably secured to the bracket by fasteners, typically releasable snap-action fasteners. A plurality of such fasteners may be provided at different positions on a cup to enable attachment of a cup to the bracket in various attitudes, thus to accommodate various orientations of a filter panel relative to the force of gravity, so that the cakes are maintained in the cups.

The preferred location of the bracket structure is on the exit side of the filter panel, to reduce dust fouling of the surfaces of the treatment cakes, but where considerations of access or interference so dictate, the dispensing device may be mounted on the inflow of the filter without material deterioration of the performance.

BRIEF DESCRIPTION OF THE DRAWINGS

FIG. 1 is a perspective view of a conventional air filter panel with a preferred form of the dispensing device for air treatment material mounted thereon;

FIG. 2 is a front elevational view of the dispensing device of FIG. 1;

FIG. 3 is a plan view of the dispensing device of FIGS. 1 and 2; and

FIG. 4 is an enlarged, partial, exploded perspective view of the dispensing device of FIGS. 1 to 3, showing details of the mounting bracket and details of a single cup of the dispenser.

DETAILED DESCRIPTION OF THE PREFERRED EMBODIMENT

FIGS. 1 and 2 show a filter panel 2 on which an air treatment material dispenser 10 of the invention is mounted. The dispenser includes a bracket assembly 6 and a plurality of dispensing cups 4.

The bracket assembly 6 comprises a pair of similar bracket elements or halves 16, 26, held together by a sliding friction grip sleeve 30. The outer end portions of bracket halves 16, 26 are bent to form engagement hooks 12, 22, respectively, adapted to engage the edge portions of the frame of filter panel 2. The two halves of the bracket assembly are relatively slidable to engage hooks 12, 22 on the filter edge portions and the sleeve 30 is pressed onto the halves of the bracket to secure them in position.

The cups 4 are so affixed to the bracket assembly 6 as to orient the cakes of air treatment material by gravity, their positions being dependent on the alignment of the filter panel within the air distribution system.

The exploded perspective view of FIG. 4 illustrates the construction of a typical bracket element 16 with its integral attachment hook 12 and a plurality of mounting holes 18 for securement of cups 4. The securement of the cups 4 onto the bracket assembly 6 is preferably by means of snap-action buttons 40 on the cups. A cup 4a is equipped with a button 40 centrally mounted in its base and with an additional button 40p on its periphery, the buttons being in mutually orthogonal alignments. Either of these buttons 40 and 40p may be utilized to attach the cup 4a to the bracket assembly 6 so that the cup is disposed or oriented to retain an air treatment cake by gravity, depending on the orientation of the filter panel 2 in the ductwork of the air distribution system.

As shown in FIG. 4, the clip 30 is affixed to the inner end portion of bracket element 26 by means of an adhesive or welding, depending upon the material of construction of the bracket, with offset bent tabs 31 engaging the bracket element 16 in a frictional grip.

The air treatment material cake is exposed to the air flow by passage through the open end of the cup 4a and/or through openings 14 in the sidewall and openings 24 in the base 34 of the cup.

Although in the illustrated embodiment of the dispensing device 10, the number of cups employed is four, any desirable number may be used. The treatment materials contained in these cups can be selected from those commercially available; if a suitable composition answering all purposes cannot be found, different respective materials may be placed in the several cups attached to a bracket assembly 6, so as to properly treat the air passing therethrough.

Upon exposure to the teachings herein it may become evident to one skilled in the mechanical arts to substitute certain elements for those described with reference to the preferred embodiment described hereinabove. For example, it may be proposed to substitute a threaded lock for the friction sleeve 30, or threaded attachment means for the cups 4 instead of the buttons 40 acting on a snap-action principle. Such changes and substitutions shall be deemed to be encompassed by the disclosure, the subject invention being solely delimited by the appended claims.

I claim:

1. A dispensing device for mounting cakes of air treatment materials on filter panels in air distribution systems, comprising:
    bracket means adapted to be secured to an air filter panel,
    a plurality of open cups for receiving said cakes of treatment material, and
    coupling means for securing the cups to the bracket means.
2. A dispensing device according to claim 1, wherein:
    said cups have openings defined therein to permit passage of air therethrough.
3. A dispensing device according to claim 1 or claim 2, wherein:
    the bracket means comprises elongated mutually slidable elements being formed with integral hooks at their outer end portion for engaging opposite edge portions of said filter panel.
4. A dispensing device according to claim 3, wherein:
    said bracket means further comprises friction catch menas for securing overlapping portions of said elongated elements.
5. A dispensing device according to claim 1, wherein:
    said coupling means include fasteners.
6. A dispensing device according to claim 5, wherein:
    said fasteners are releasable snap-action fasteners.
7. A dispensing device according to claim 5, wherein:
    said fasteners are mounted on the cups in mutually orthogonal relation.

* * * * *